Jan. 7, 1936.   E. A. M. FLIESBERG ET AL   2,026,880
TRANSMISSION GEAR
Filed July 10, 1933   2 Sheets-Sheet 1

INVENTORS
E. A. M. Fliesberg
A. Björklund
BY Marks & Clerk
ATTORNEYS.

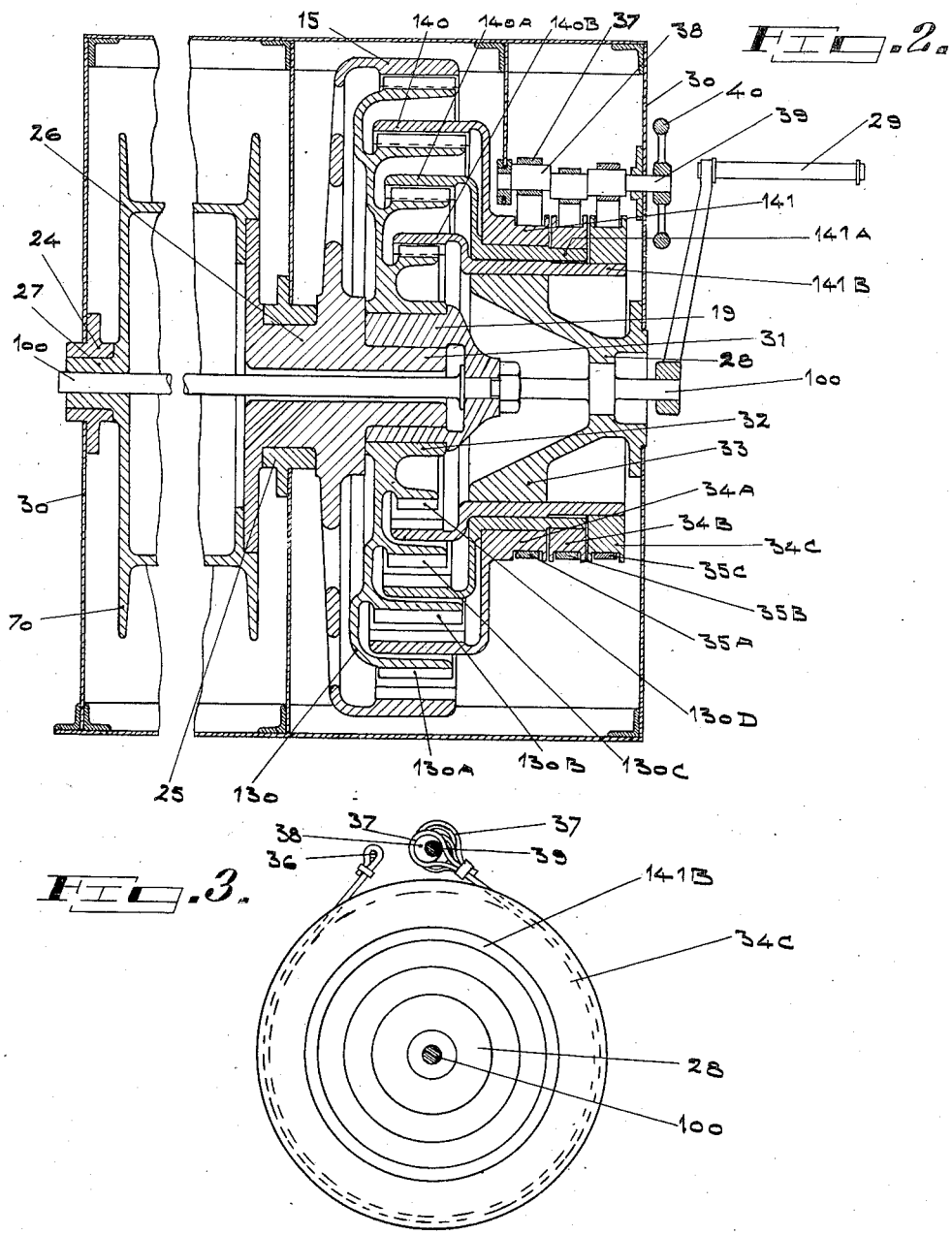

Patented Jan. 7, 1936

2,026,880

UNITED STATES PATENT OFFICE 2,026,880

TRANSMISSION GEAR

Erhard A. M. Fliesberg, Appelviken, Stockholm, and Alrik Björklund, Goteborg, Sweden; said Björklund assignor to said Fliesberg Application July 10, 1933, Serial No. 679,814
In Sweden July 9, 1932

12 Claims. (Cl. 74—309)

(Granted under the provisions of sec. 14, act of March 2, 1927; 357 O. G. 5)

This invention refers itself to transmission gears of the type where the motive power from a driving shaft is transferred to a driven shaft by means of toothed wheels. More specifically this invention refers to such toothed gears with two annular wheels the one of which is stationary and the other wheel fixed on the one of the aforesaid two revolving shafts, and the motion transferred between said two annular wheels by means of two gear wheels which are rigidly connected with one another and cooperate, the one gear wheel with the stationary annular wheel and the other gear wheel with the rotatable annular wheel.

The main object of this invention is to diminish the strains upon the gear and especially upon its bearing so as to reduce the dead resistances against the motion.

Another object of this invention is to remove as far as possible any tilting effect of the gear when applied, for instance, to a pulley block or similar appliances.

A further object of this invention is to contract the sizes of the gear and thus of the machinery which is provided with such a gear.

Still an object of this invention is a transmission gear which allows extensive limits between the revolving speed of the driving shaft and that of the driven shaft without undue vibrations.

In the accompanying drawings two embodiments of this invention are illustrated as examples though we do not limit ourselves to exclusively these embodiments.

Fig. 2 is a broken sectional elevation of a modification, and

Fig. 3 is an elevation in detail of a part of the shifting gears.

Figure 1:
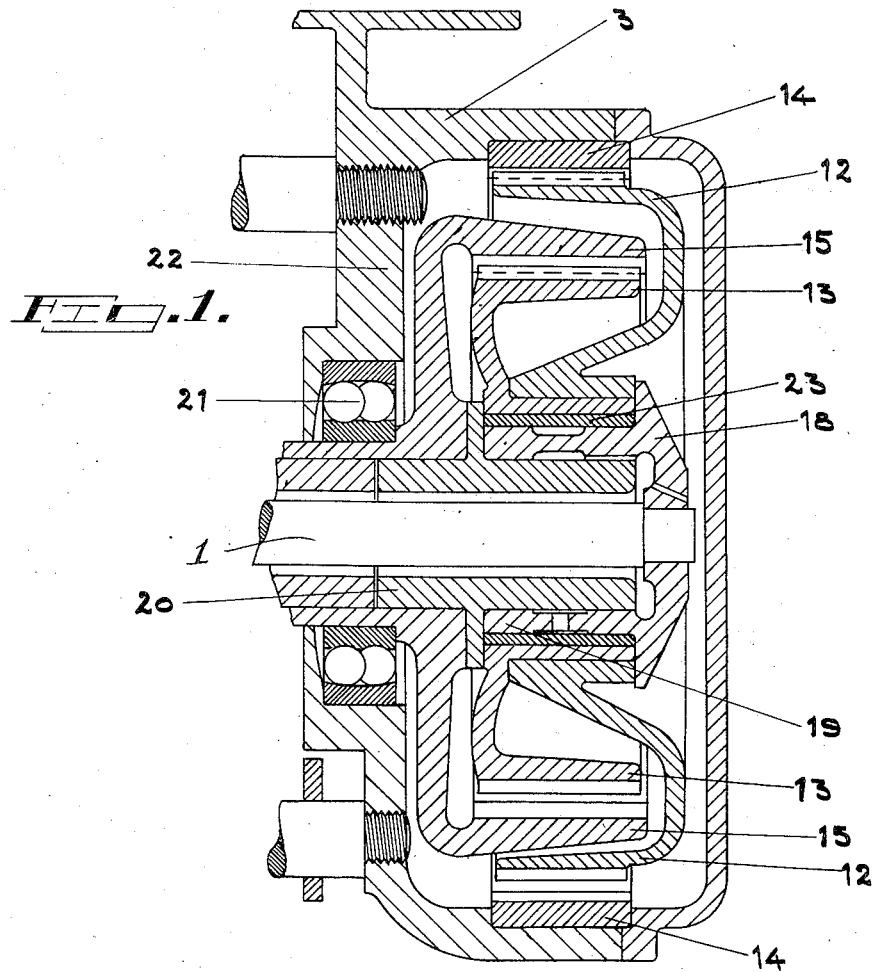
Figure 1 is a sectional elevation of the new gear, the mechanism driven thereby not being shown.

Referring to Fig. 1, the driving shaft 1 is shown supported at the right in a cap 18, the opposite supporting means not being shown. The cap 18 has a sleeve-shaped projection 19 the inner surface of which is concentric to the shaft 1 and mounted on a cylindrical sleeve 20 which is concentric to and freely rotatable around the shaft 1 and is inserted into the concentric hub of the movable annular wheel 15 which is supported by a ball bearing 21 in the partition wall 22 of the casing 3. The cap 18 is keyed on the shaft 1 and thus supports said shaft on the sleeve 20.

The outer surface of sleeve 19 is eccentric to shaft 1. On said eccentric surface the hub of the inner gear wheel 13 rotates and a sleeve 23 of some antifrictional metal in the hub of gear wheel 13 facilitates the revolving motion. The outer gear wheel 12 is keyed on the hub of gear wheel 13 so that it follows the rotation of the wheel 13 the two gear-wheels revolving together around sleeve 19.

The gear wheel 12 meshes with the stationary annular wheel 14, and gear wheel 13 meshes with the rotatable annular wheel 15.

This embodiment of the gear has proven itself favourable especially in fast running gears.

In accordance with this invention the rims of all the gear wheels 13, 14, 15, 16, surround each other in such a manner that the theoretical radial middle planes of said rims substantially coincide. The effect of this will be a substantial elimination of any couple of forces created by the pressure at the pitch line of the different gear wheels.

Such couple of forces, on the contrary, cannot be dispensed with in the usual gears where the advance wheels are laterally displayed. This absence of any couple of forces reduces the pressure on the bearings as well as the tilting ability of the driven mechanism, for example, a pulley block, thus reducing the frictional resistances also, and allows the use of small bearing surfaces and smaller gear wheels, and makes the operation of the pulley block extraordinarily smooth and easy, thus increasing the efficiency of the machine.

It is to be understood that one or both annular wheels 14, 15 can be provided with more than one rim of teeth of different diameters whereby the corresponding gear wheel 12, 13 respectively must have a special rim of teeth for each such supplemental rim of teeth in its annular wheel, and means be provided for shifting the cooperative rims of teeth, thus making the gear shiftable for various speed. This shifting of the gear must be affected from outside the gear just as in shiftable gears for other purposes.

Within a casing 30 a winch drum 70 is supported by bearings 24 and 25 and provided at the right hand end with an annular gear wheel 15, the hub of which on the left hand side of the wheel serves as a journal for the drum 70 with which drum said hub is rigidly secured. Through a bore in the hub 26 as well as in the left hand end journal 27 of the drum 70 a shaft 100 passes freely rotatable in relation to the drum 70 and wheel 15, and supported near the right hand end by a bearing 28, and provided with a handle or crank 29 outwardly the casing 30. The right hand projecting portion 31 of the hub of wheel 15 also has a cylindrical outer surface and serves as a journal for a sleeve 19 which is secured on the shaft 100 so as to follow the revolving of said shaft. The outer surface of the sleeve 19 is eccentric as clearly visible in Figure 4. Said eccentric like a journal supports the freely rotatable hub 32 of a gear wheel 130 which is provided with a series of co-axial toothed rims 130A—D. Each of said rims coacts with a corresponding toothed annular wheel, viz. the rim 130A with the wheel 15, the rim 130B with a wheel 140, the rim 130C with a wheel 140A, and the rim 130D with a wheel 140B. All the annular wheels 140, 140A, 140B are provided with sidewardly projecting hubs 141, 141A, 141B respectively which are cylindrical on their outsides as well as in their bores, and they are mounted telescopically within each other supported by a cylindrical member 33 which is secured to the right hand side plate of the casing 30. All the annular wheels 140, 140A and 140B are freely rotatable around said cylindrical member 33, which is coaxial with the shaft 100 and the drum 70, but they are also provided each with a brake comprising a cylindrical disc 34A, 34B, 34C respectively. Of these discs that one with number 34A is turned out directly in the wheel hub 141, while disc 34B is rigidly attached to the wheel hub 141A, and disc 34C rigidly attached to wheel hub 141B, so that the said discs revolve each with its corresponding annular wheel. Around each of the discs there is wound a brake strap 35A, 35B, 35C respectively of thin and flexible steel plate, the one end 36 of which straps in a known manner is secured to the casing 30, while the opposite ends 37 of the straps are shaped as eyes and mounted on eccentrics 38. These eccentrics are all supported by a common shaft 39 which is journalled in the casing 30 and rotatable by means of hand wheel 40 disposed outside the casing.

The eccentrics 38 are set at different angles as shown in Figures 4 and 5, the result being that when revolving the shaft 39 by the hand wheel 40 one brake strap only will be tightened up at the time, and the other two straps will remain slackened. By this means it is possible voluntary to make either of the annular wheels 140, 140A or 140B stationary, and thus to change the revolving speed transferred from handle 29 through shaft 100, the eccentric sleeve 19 and the manifold gear wheel 130 on to the annular wheel 15 and the winch drum 70. Those of the annular wheels 140, 140A, 140B which for the moment are not secured to the casing 30 by their brakes will revolve idle when meshing with their respective toothed rims on wheel 130. The brakes make it very easy to shift the speed of the winch drum without shocks or interruptions in the operation.

It is to be noted that the teeth of the different gears 130D, 130C, 130B and 130A, are wider progressively from the center outwardly, those of 130D being the narrowest and those of 130A being the widest. This is also true of the respective gears with which they intermesh. Thus, those under a heavy load are given greater width than those under a lighter load. It is also to be noted that the outer rim of each pair of coacting gear wheels is broader than the inner rim thereof.

What we claim is:

1. A transmission gear comprising a central gear shaft, a rotary driving member and a rotary driven member coaxial thereto, bowl-shaped gear wheels, the larger enclosing the smaller ones, said gear wheels intermeshing in pairs for rotating said driven member, two of said gear wheels being concentric to the central gear shaft, while the other gear wheels are eccentric thereto, a cylindrical member concentric to said central gear shaft, a sleeve secured to said central gear shaft and rotatably supported by said cylindrical member, the outer surface of said sleeve being eccentric to said central gear shaft and forming a journal bearing for said eccentric gear wheels and all said concentric gear wheels and eccentric gear wheels surrounding said sleeve within their bowls having the radial middle planes of all their toothed rims substantially coinciding with the radial middle planes of the concentric bearing surface as well as of the eccentric bearing surface of said sleeve.

2. A transmission gear as claimed in claim 1, having the cylindrical member which rotatably supports the sleeve secured to the slowest running wheel of the gear.

3. A transmission gear as claimed in claim 1, having the cylindrical member which supports the sleeve stationarily secured to the casing of the gear.

4. A transmission gear according to claim 1, in which the width of the teeth in the intermeshed pairs of gear wheels is smaller in those pairs of gear wheels whose pitch circle has a larger diameter than in those pairs of gear wheels whose pitch circle diameter is smaller.

5. A transmission gear according to claim 1, in which in each pair of coacting gear wheels the width of the outer rim is greater than that of the inner rims.

6. An eccentric toothed gearing according to claim 1, the one of said concentric wheels and the eccentric wheel cooperating therewith, provided with more than one rim of teeth of different operative diameters, the middle radial planes of all the rims of teeth coinciding, and selective means for simultaneously making only one pair of cooperating rims of teeth operative and making the other pairs idle.

7. An eccentric toothed gearing including a driving member and a driven member concentric thereto, an annular toothed wheel rigidly secured to the driven member and coacting with an externally toothed gear wheel freely rotatable around an eccentric member and rigidly connected to another externally toothed gear wheel which coacts with a stationary annular toothed wheel concentric to the said driving member and said driven member, whereby the middle radial planes of all the toothed rims in the gearing coincide, characterized therein that a flexible member is provided between the driving member and the driven member allowing an automatical adjusting in the coaction of the various gear wheels and wherein any of the two annular wheels and the externally toothed gear wheel cooperating therewith are provided with more than one rim of teeth of different operative diameters, the middle radial planes of all said rims of teeth coinciding, and selective means for simultaneously making only one pair of such cooperating rims of teeth operative and making the other pairs idle.

8. An eccentric toothed gearing including a driving member and a driven member concentric thereto, an annular toothed wheel rigidly secured to the driven member and coacting with an externally toothed gear wheel freely rotatable around an eccentric member and rigidly connected to another externally toothed gear wheel which coacts with a stationary annular toothed wheel concentric to the said driving member and said driven member, whereby the middle radial planes of all the toothed rims in the gearing coincide, characterized therein that a flexible member is provided between the driving member and the driven member allowing an automatical adjusting in the coaction of the various gear wheels and wherein any of the two annular wheels and the externally toothed gear wheel cooperating therewith are provided with more than one rim of teeth of different operative diameters, the middle radial planes of all said rims of teeth coinciding, selective means for simultaneously making only one pair of such cooperating rims of teeth operative and making the other pairs idle, and the width of the teeth being broader in pairs of cooperating toothed rims of less diameter than in such cooperating rims of larger diameter to meet the heavier stress on the smaller wheels.

9. An eccentric toothed gearing including a driving member and a driven member concentric thereto, an annular toothed wheel rigidly secured to the driven member and coacting with an externally toothed gear wheel freely rotatable around an eccentric member and rigidly connected to another externally toothed gear wheel which coacts with a stationary annular toothed wheel concentric to the said driving member and said driven member, whereby the middle radial planes of all the toothed rims in the gearing coincide, characterized therein that a flexible member is provided between the driving member and the driven member allowing an automatical adjusting in the coaction of the various gear wheels and wherein any of the two annular wheels and the externally toothed gear wheel cooperating therewith are provided with more than one rim of teeth of different operative diameters, the middle radial planes of all said rims of teeth coinciding, selective means for simultaneously making only one pair of such cooperating rims of teeth operative and making the other pairs idle, the width of the teeth being broader in pairs of cooperating toothed rims of less diameter than in such cooperating rims of larger diameter to meet the heavier stress on the smaller wheels, and in each pair of cooperating rims of teeth the width of the teeth in the annular wheel being broader than the width of the teeth in the corresponding externally toothed gear wheel.

10. A transmission gear comprising a rotary driving member and a rotary driven member coaxial therewith, gear wheels enclosing each other in the manner of bell-cones for rotating said driven member, some of which gear wheels are concentric to the driving and the driven members while others are eccentric thereto, a central journal bearing on the gear shaft and gear wheels surrounding said central journal bearing in the manner of a bell-cone and in which said journal bearing is formed as a sleeve being secured to the gear shaft and the bore of the sleeve coaxial to the gear shaft, which sleeve is supported by a stationary part secured to the slow-running wheel, the outer surface of said sleeve being eccentric to said gear shaft and forming the journal bearing for the eccentric gear wheel.

11. A transmission gear comprising a rotary driving member and a rotary driven member coaxial therewith, gear wheels enclosing each other in the manner of bell-cones for rotating said driven member, some of which gear wheels are concentric to the driving and the driven members while others are eccentric thereto, a central journal bearing on the gear shaft and gear wheels surrounding said central journal bearing in the manner of a bell-cone and in which the width of the teeth in the intermeshed pairs of gear wheels is smaller in those pairs of gear wheels whose pitch circle has a larger diameter than in those pairs of gear wheels whose pitch circle diameter is smaller.

12. A transmission gear comprising a rotary driving member and a rotary driven member coaxial therewith, gear wheels enclosing each other in the manner of bell-cones for rotating said driven member, some of which gear wheels are concentric to the driving and the driven members while others are eccentric thereto, a central journal bearing on the gear shaft and gear wheels surrounding said central journal bearing in the manner of a bell-cone and in which in each pair of coacting gear wheels the width of the outer rim is greater than that of the inner rim.

ERHARD A. M. FLIESBERG.
ALRIK BJÖRKLUND.